No. 622,061. Patented Mar. 28, 1899.
J. E. MUSTARD.
WINDROWING ATTACHMENT FOR MOWERS.
(Application filed Oct. 7, 1897. Renewed Feb. 17, 1899.)
(No Model.)
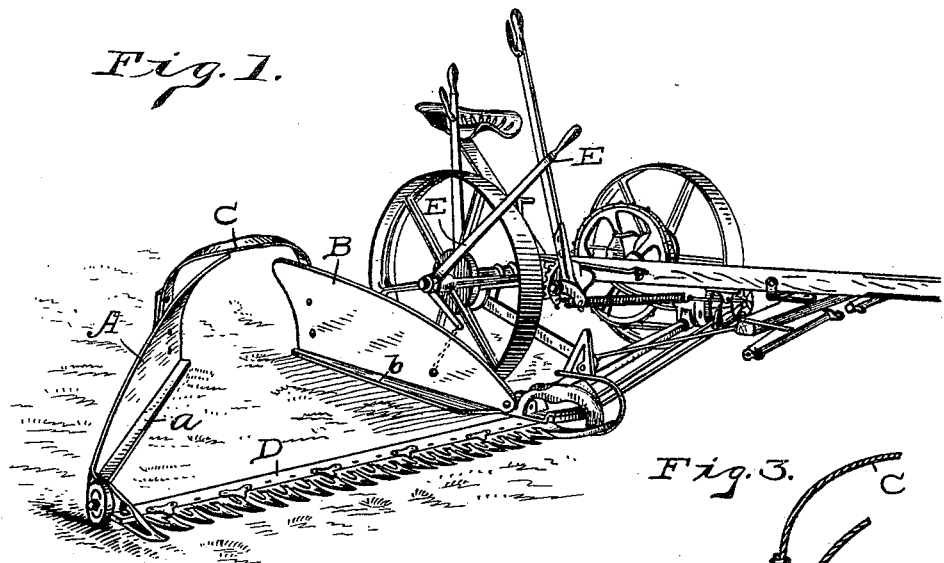
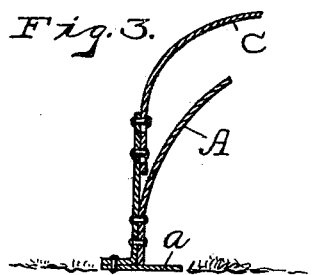
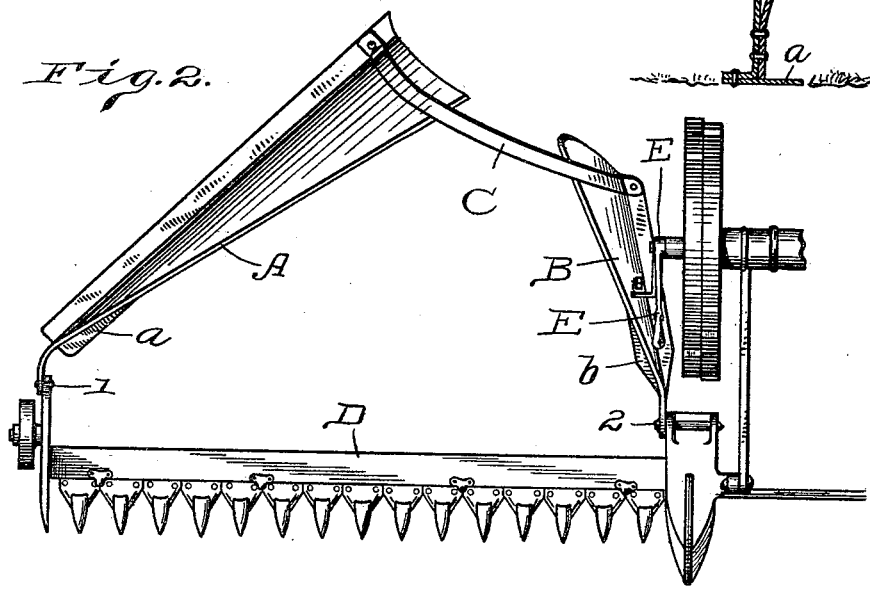
WITNESSES:
F. W. Werner.
J. A. Walsh.
INVENTOR
James E. Mustard,
BY
Chester Bradford,
ATTORNEY.

UNITED STATES PATENT OFFICE.

JAMES E. MUSTARD, OF GLEN HALL, INDIANA, ASSIGNOR TO CHESTER BRADFORD, OF INDIANAPOLIS, INDIANA.

WINDROWING ATTACHMENT FOR MOWERS.

SPECIFICATION forming part of Letters Patent No. 622,061, dated March 28, 1899.

Application filed October 7, 1897. Renewed February 17, 1899. Serial No. 705,860. (No model.)

*To all whom it may concern:*

Be it known that I, JAMES E. MUSTARD, a citizen of the United States, residing at Glen Hall, in the county of Tippecanoe and State of Indiana, have invented certain new and useful Improvements in Windrowing Attachments for Mowers, of which the following is a specification.

The object of my said invention is to provide a means whereby grass, &c., may immediately after being cut by a mowing-machine be continuously gathered into a windrow.

Said invention is principally designed for use in gathering clover from which the seed is to be saved, which, as is well known, should not be disturbed more than possible from the time it is cut until it is taken from the field.

Said invention consists of an improved arrangement of converging sides leading from the ends of the finger-bar of the mower rearwardly and inwardly until they reach a distance apart equal to the width of the proposed windrow and whereby in either case the clover or grass as it is cut will be drawn and thrown together, as will be hereinafter more particularly described and claimed.

Referring to the accompanying drawings, which are made a part hereof and on which similar letters and numerals of reference indicate similar parts, Figure 1 is a perspective view of a mowing-machine with one of my improved windrowing attachments connected to the finger-bar in position for use; Fig. 2, a top or plan view of said attachment and the cutting apparatus and immediately adjacent parts on a somewhat larger scale, and Fig. 3 a detail sectional view on the dotted line 3 3 in Fig. 2.

The mowing-machine, including the finger-bar, is or may be in itself of any ordinary or desired construction, and as it is not peculiar to my present invention will not be further described herein except incidentally in describing said invention.

The windrowing attachment is preferably composed of the two converging sides A and B, which are preferably connected at the rear end by a tie-bar C and which at the forward end are connected by pivots 1 and 2 to the finger-bar D. The sides A and B have on their lower edges flat shoes *a* and *b*, both to serve as runners in carrying the attachment over the surface of the ground and to extend slightly under the edges of the mass of clover or grass being cut, and thus facilitate the necessary manipulation thereof in forming it into windrows, as well as preventing any of it from escaping under the edges of the said sides A and B.

The sides A and B are shown as formed of sheet metal; but they may obviously be formed of any suitable material and may be made of slats or bars suitably connected together.

The windrowing attachment as a whole is adapted to be raised off the ground and out of operative position whenever required by means of a suitable lever E, which is shown as mounted on the end of the axle of the mowing-machine outside the wheel thereof and as connected to the side B of the windrowing attachment by a short chain or link, this being best illustrated in Fig. 1.

As shown in the drawings, the sides A and B are of a curved formation, which I have found by experience to be the best form to direct the clover or grass into a suitable windrow and to give said winrow a shapely formation, and this I consider to be of considerable consequence.

The tie-bar C, I prefer to attach with a certain degree of looseness, so that there may be some relative movement between the two sides, permitting them to follow inequalities in the ground better than if said sides were rigidly connected together. Substantially the same result may be obtained by making said bar somewhat flexible. In Fig. 3 I have shown the bar C cut in two on one side and one part overlapping the other and so attached (by means of stud-bolts and slots) as that one part shall have a limited motion in relation to the other part. This obviously gives the result above described.

Having thus fully described my said invention, what I claim as new, and desire to secure by Letters Patent, is—

1. The combination, with the finger-bar of a mowing-machine, of a windrowing attachment connected thereto consisting essentially of converging sides formed curved inwardly from bottom to top, and having inwardly-projecting strips or shoes on their bottom edges, substantially as set forth.

2. The combination with the finger-bar of a mowing-machine, of a windrowing attachment consisting essentially of converging sides connected near their rear ends to allow slight independent movement, and means for lifting the same when desired, substantially as set forth.

3. The combination, with the finger-bar of a mowing-machine, of the windrowing attachment consisting of the two sides A and B and a tie-bar C, said bar being composed of two parts slidably connected together whereby a variable relation between said sides is permitted.

4. The combination, with the finger-bar of a mowing-machine, of a windrowing attachment composed of converging sides connected together by a suitable tie-bar, and a suitable lever carried by the mowing-machine and adapted to be operated to raise said windrowing attachment when desired, substantially as set forth.

In witness whereof I have hereunto set my hand and seal, at Glen Hall, Indiana, this 28th day of September, A. D. 1897.

JAMES E. MUSTARD. [L. S.]

Witnesses:
 H. C. MUSTARD,
 JOHN BUCHANAN.